UNITED STATES PATENT OFFICE.

ANDREW ENGLE, OF METZ, IOWA.

METHOD OF MAKING FERTILIZER.

No. 895,353.     Specification of Letters Patent.     Patented Aug. 4, 1908.

Application filed March 5, 1907. Serial No. 361,142.

*To all whom it may concern:*

Be it known that I, ANDREW ENGLE, a citizen of the United States, residing at Metz, in the county of Jasper and State of Iowa, have invented a new and useful Method of Making Fertilizer, of which the following is a specification.

My composition consists of the following ingredients, combined in about the proportions stated, viz.—night soil about ten (10) barrels, unslaked lime about one (1) barrel, tar, preferably coal tar, about two (2) gallons. In my method of combining these ingredients I first add the lime to the night soil consisting of solid and fluid matter and when the lime becomes heated and is forming into hydrate and the mass is heating I add the tar to be heated and diffused in the mass, and to serve as an adhesive matter in uniting and retaining all the ingredients in a mass that is susceptible of being broken into pieces and comminuted as required for distributing it to plants in the ground to serve as an insecticide and also promote the growth of the plant. These ingredients are to be thoroughly mingled by agitation in a machine or in any suitable way. The liquid portion of the night soil contains nitrogenous matter and is an essential and valuable part of the ingredients that produce the composition because it wets the lime as required to heat the mass of matter and to melt, diffuse and unite the tar with the other ingredients. The lime as it slakes will deodorize the waste material as required to remove its offensive smell and at the same time heat and melt the tar as required to be diffused in the waste material.

I am aware that tar alone in contact with vegetation is destructive but when diffused in fertilizing matter as contemplated by my invention and placed in and mixed with ground it will aid in promoting the growth of vegetation and plants fertilized therewith will be more vigorous in growth and consequently more valuable. The tar in the composition will also act as an insecticide for the protection of plants from worms, insects, fungi, &c., that are destructive to vegetation whenever they have access to growing vegetation. When the mass of matter is thus united and becomes dry and hard it is broken and comminuted as required for distribution to plants as a fertilizer and insecticide. Night soil and like offensive waste matter can be thus advantageously disposed of and utilized for fertilizing purposes.

I claim:

1. The method of making fertilizer composition which method consists essentially in first mixing the night soil and lime to thereby heat the mixture, then adding tar to be diffused by means of the heat in the mixture and then stirring the mass while it is in a heated and plastic state, as set forth.

2. The method of making fertilizer composition which method consists essentially in first mixing night soil and lime to thereby heat the mixture, then adding tar to be diffused by means of the heat produced by the lime and then stirring the mass while it is in a heated and plastic state, and, after the mass is cold and hard, grinding the composition, as set forth.

3. The method of making a composition for fertilizing purposes and utilizing offensive waste material which method consists in first mixing night soil and lime, then adding tar, then stirring the mixed matter while in a heated state, and after the mixture is cold and hard reducing the composition into small particles, as set forth.

ANDREW ENGLE.

Witnesses:
   WARREN WALKER,
   THOMAS G. ORWIG.